(12) United States Patent
Mahdi

(10) Patent No.: US 8,249,019 B2
(45) Date of Patent: Aug. 21, 2012

(54) SYSTEM AND METHOD FOR SR-VCC OF IMS EMERGENCY SESSIONS

(75) Inventor: Kaniz Mahdi, Carrollton, TX (US)

(73) Assignee: FutureWei Technologies, Inc., Plano, TX (US)

( * ) Notice: Subject to any disclaimer, the term of this patent is extended or adjusted under 35 U.S.C. 154(b) by 344 days.

(21) Appl. No.: 12/539,294

(22) Filed: Aug. 11, 2009

(65) Prior Publication Data

US 2010/0054209 A1 Mar. 4, 2010

Related U.S. Application Data

(60) Provisional application No. 61/091,768, filed on Aug. 26, 2008.

(51) Int. Cl.
*H04W 4/00* (2009.01)
*H04M 11/04* (2006.01)

(52) U.S. Cl. ................................ 370/331; 455/404.2

(58) Field of Classification Search ............... 455/404.2, 455/414.1, 414.2, 404.1, 436, 435.1, 412.1, 455/412.2; 370/352, 331, 338, 332, 333
See application file for complete search history.

(56) References Cited

U.S. PATENT DOCUMENTS

| | | | |
|---|---|---|---|
| 2003/0139183 A1* | 7/2003 | Rantalainen | 455/435 |
| 2006/0077961 A1 | 4/2006 | Crago et al. | |
| 2007/0060097 A1 | 3/2007 | Edge et al. | |
| 2007/0149166 A1* | 6/2007 | Turcotte et al. | 455/404.1 |
| 2007/0254625 A1* | 11/2007 | Edge | 455/404.1 |
| 2008/0026752 A1* | 1/2008 | Flore et al. | 455/435.2 |
| 2008/0089486 A1* | 4/2008 | Madour et al. | 379/45 |
| 2008/0159223 A1 | 7/2008 | Palat et al. | |
| 2008/0261557 A1 | 10/2008 | Sim | |
| 2009/0036130 A1* | 2/2009 | Diachina et al. | 455/436 |
| 2009/0061877 A1* | 3/2009 | Gallagher et al. | 455/436 |
| 2009/0156213 A1* | 6/2009 | Spinelli et al. | 455/436 |
| 2009/0267128 A1* | 10/2009 | Maejima | 257/314 |

(Continued)

FOREIGN PATENT DOCUMENTS

CN 101175248 A 5/2008

(Continued)

OTHER PUBLICATIONS

3rd Generation Partnership Project, Technical Specification Group Services and System Aspects, "Single Radio Voice Call Continuity (SRVCC)," Stage 2, Release 9, 3GPP TS 23.216 V9.0.0, Jun. 2009, pp. 1-39.

(Continued)

*Primary Examiner* — Melody Mehrpour
(74) *Attorney, Agent, or Firm* — Slater & Matsil, L.L.P.

(57) ABSTRACT

Methods and apparatuses for enabling Single Radio (SR)-Voice Call Continuity (VCC) of emergency calls are provided. More specifically, the methods and apparatuses provide continuity of IMS emergency sessions established in 4G access for mobility to 3G/2G access. Generally, a Mobility Management Entity (MME) in the packet switch (PS) domain provides a handover request to a Mobile Switching Center (MSC) Server in the circuit switch (CS) domain. The handover request includes an indication that the call is an emergency call and may include an indication that a Packet Switched Network Induced Location Request (PS-NI-LR) or similar location reporting procedure is required and/or a Gateway Mobile Location Center (GMLC) address. The MSC Server facilitates the handover to the CS domain via the Mg and/or Mw interface.

25 Claims, 3 Drawing Sheets

U.S. PATENT DOCUMENTS

| | | | |
|---|---|---|---|
| 2009/0296660 A1* | 12/2009 | Weng | 370/332 |
| 2010/0034166 A1* | 2/2010 | Olvera-Hernandez | 370/331 |
| 2010/0142488 A1* | 6/2010 | Zhang et al. | 370/332 |
| 2011/0206003 A1* | 8/2011 | Wu | 370/331 |

FOREIGN PATENT DOCUMENTS

| | | |
|---|---|---|
| WO | WO 2007/072462 A2 | 6/2007 |
| WO | WO 2008/023162 A2 | 2/2008 |
| WO | WO 2008/081310 A1 | 7/2008 |
| WO | WO 2008/084316 A1 | 7/2008 |

OTHER PUBLICATIONS

3$^{rd}$ Generation Partnership Project, Technical Specification Group Services and Architecture,"IP Multimedia Subsystem (IMS) Service Continuity," Stage 2, Release 9, 3GPP TS 23.237 V9.1.0, Jun. 2009, pp. 1-88.

3$^{rd}$ Generation Partnership Project, Technical Specification Group Services and System Aspects, "Functional stage 2 description of Location Services (LCS)," Release 9, 3GPP TS 23.271 V9.0.0, Jun. 2009, pp. 1-164.

3$^{rd}$ Generation Partnership Project, Technical Specification Group Services and System Aspects, "IP Multimedia Subsystem (IMS) centralized services," Stage 2, Release 9, 3GPP TS 23.292 V9.2.0, Jun. 2009, pp. 1-105.

3$^{rd}$ Generation Partnership Project, Technical Specification Group Services and System Aspects, "Feasibility Study on Voice Call Continuity Support for Emergency Calls," Release 9, 3GPP TR 23.826 V9.0.0, Mar. 2009, pp. 1-82.

3$^{rd}$ Generation Partnership Project, Technical Specification Group Core Network and Terminals, "IP Multimedia (IM) Core Network (CN) subsystem IP Multimedia Subsystem (IMS) Service Continuity," Stage 3, Release 8, 3GPP TS 24.237 V8.2.0, Jun. 2009, pp. 1-71.

3$^{rd}$ Generation Partnership Project, Technical Specification Group Core Network and Terminals, "IP Multimedia (IM) Core Network (CN) subsystem Centralized Services (ICS)," Stage 3, Release 9, 3GPP TS 24.292 V9.0.0, Jun. 2009, pp. 1-164.

"Notification of Transmittal of the International Search Report and the Written Opinion of the International Searching Authority, or the Declaration," International Application No. PCT/CN2009/073511, Applicant: Huawei Technologies Co., Ltd., et al., mailing date: Dec. 10, 2009, 19 pages.

"Extended European Search Report," Application No. 09809237.2-2412, Applicant: Huawei Technologies Co., Ltd., mailing date: Feb. 3, 2012, 7 pages.

"3$^{rd}$ Generation Partnership Project; Technical Specification Group Services and System Aspects; Feasibility Study on Voice Call Continuity Support for Emergency Calls (Release 8)", 3GPP TR 23.826, V0.3.0, Nov. 2011, pp. 1-41.

Russian Office Action, "Questions, Arguments, Objections, Proposals," Application No. 2011101947, Applicant: Huawei Technologies Co., Ltd., Apr. 23, 2012, 7 pages.

* cited by examiner

SYSTEM AND METHOD FOR SR-VCC OF IMS EMERGENCY SESSIONS

This application claims the benefit of U.S. Provisional Application No. 61/091,768, filed on Aug. 26, 2008, entitled "System and Method for SR-VCC of IMS Emergency Sessions," which application is hereby incorporated herein by reference.

TECHNICAL FIELD

The present invention relates generally to telecommunications and, more particularly, to a system and method for providing call continuity of an IP Multimedia Subsystem (IMS) emergency session established in 4G access for mobility to 3G/2G access.

BACKGROUND

IMS is an architectural framework for delivering Internet Protocol (IP) multimedia to mobile users. IMS is designed to deliver integrated multimedia services and create an open, standard-based network. IMS Centralized Services is an approach to the provision of communication services wherein services and service control are based on IMS mechanisms and enablers, and support is provided for a diversity of access networks (including circuit switched and IP based, wireless and wireline). Service continuity between domains, e.g., the circuit switch (CS) domain and the packet switch (PS) domain, is also provided.

Single Radio (SR)-Voice Call Continuity (VCC) is a key aspect of the IMS, allowing a user equipment (UE) to move between different network access technologies while maintaining a consistent user experience. For example, a UE may roam between a 4G PS domain (e.g., IMS) and a 2G/3G CS domain while maintaining call continuity and a consistent user interface. During a standard normal (non-emergency) session in the IMS, the application control of the session is controlled by the home network, e.g., the home Call Session Control Function (CSCF) and Service Centralization Continuity Application Server (SCC AS). This use of the home network allows standard normal sessions to be handed over between a 4G system and a 2G/3G system seamlessly.

Emergency calls, however, are handled differently. In particular, emergency calls are handled by the visiting network such that the local network is the serving network. Emergency calls are routed to a Public Safety Answering Point (PSAP) associated with the serving network and, hence, the current location of the UE. In this case, the home network does not control the call.

The use of the visiting network to handle emergency calls precludes the normal handover procedures from being used. Normal, non-emergency session transfers were controlled by the home SCC AS. Because emergency sessions are not controlled by the home SCC AS, the normal, non-emergency session transfer procedures are not sufficient. As a result, there is a need for a system and a method for providing continuity of emergency sessions for mobility between 4G systems and 2G/3G systems.

SUMMARY OF THE INVENTION

These and other problems are generally solved or circumvented, and technical advantages are generally achieved, by preferred embodiments of the present invention which provides call continuity of an IP Multimedia Subsystem (IMS) emergency session established in 4G access for mobility to 3G/2G access.

Embodiments of the present invention provide systems, methods, and apparatuses for handing an emergency call from a packet switch (PS) domain (e.g., IMS) to a circuit switch (CS) domain. Generally, a Mobility Management Entity (MME) in the PS domain transmits a handover request to a Mobile Switching Center (MSC) Server in the CS domain. The handover request includes an indication that the call is an emergency call. In an embodiment, the handover request may also include an indication that a Packet Switched Network Induced Location Request (PS-NI-LR) or a similar location reporting procedure is required and/or a Gateway Mobile Location Center (GMLC) address. In an embodiment, the MSC Server emulates a Proxy Call Session Control Function (P-CSCF) and presents the emergency call from the PS domain to the Emergency-CSCF (E-CSCF) via the Mw interface. In another embodiment, the MSC Server initiates the Single Radio (SR)-Voice Call Continuity (VCC) toward an Emergency Remote User Agent (E-RUA) using a E-RUA Public Service Identity (PSI) Domain Name (DN) (E-RUA PSI DN). The MSC Server acts as an anchor MSC with emergency E interface procedures towards the target MSC for establishing resources in the target access network for handover of the emergency call and for location reporting post handover. Alternatively, the MSC Server may itself establish resources in the target access network for handover, e.g., when the target access network is served by the MSC Server.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

Embodiments of the present invention discussed herein are described in the context of performing a handover request from one access point to another access point, such as handing over from the Packet Switch (PS) domain to the Circuit Switch (CS) domain, of an emergency call session. In particular, embodiments of the present invention provide systems and methods for session continuity of an emergency call when a user equipment (UE) moves between a 4G system and a 2G/3G system. One of ordinary skill in the art will realize that other embodiments of the present invention may be applied to other situations as well as different networks, such as ad hoc networks, cellular networks, wireline networks, and the like, as well as other architectural configurations.

Figure 1:
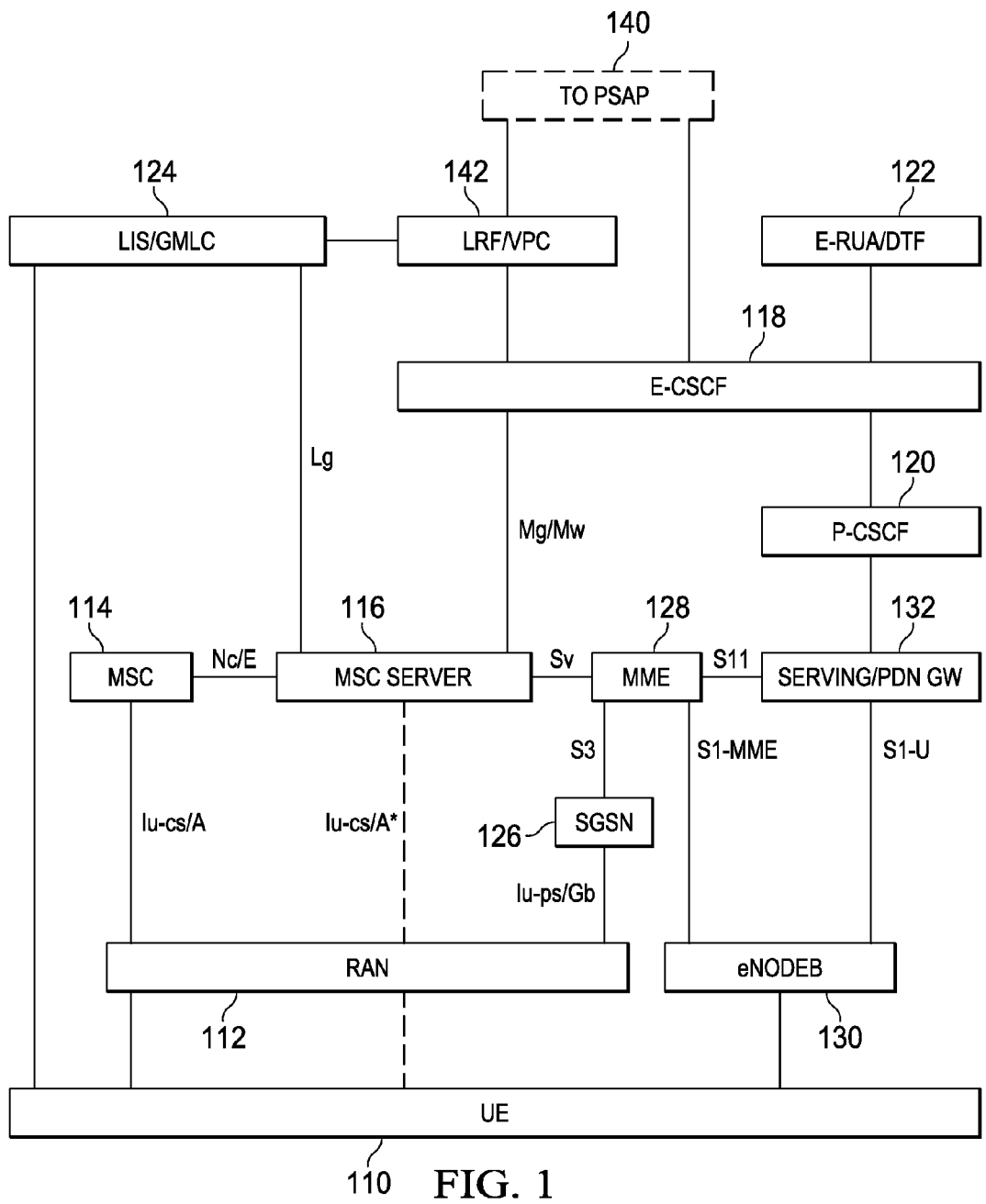
FIG. 1 illustrates a functional architecture diagram in accordance with an embodiment of the present invention.

Referring now to FIG. 1, there is shown an architecture diagram in accordance with an embodiment of the present invention. A UE 110 comprises a user device and may include any type of device providing voice and/or data access, such as a wireless phone, computer, personal data assistant (PDA), or the like, via a CS and/or PS communications path. In an embodiment the UE 110 is a dual-mode 3G/4G device capable of communicating via packet-switched communications and/or circuit-switched communications. The UE 110 may be a standard Single Radio (SR)-Voice Call Continuity (VCC) UE with emergency call VCC capabilities.

Generally, the UE 110 connects via a Radio Access Network (RAN) 112, such as a GSM EDGE RAN (GERAN) and/or UMTS Terrestrial RAN (UTRAN), which provides access and wireless CS connectivity services to the CS core network and PS connectivity services to the IMS network (a PS-based network). In the CS domain, the RAN 112 is communicatively coupled to a Mobile Switching Center (MSC) 114 and an MSC Server 116. The MSC 114 is responsible for handling voice calls as well as CS data services for the UE 110 when operating in a CS mode. The MSC Server 116 operates in conjunction with the MSC 114 to provide mobility management.

In an embodiment, the MSC Server 116 has been enhanced for SR-VCC and may provide the same functions as specified in 3G protocols, such as 3GPP TS 23.216, which is incorporated herein by reference. As discussed below, in one embodiment, the MSC Server 116 may use the Mw interface, emulating a Proxy Call Session Control Function (P-CSCF) 120 for presentation of an IP Multimedia Subsystem (IMS) emergency session to an Emergency Call Session Control Function (E-CSCF) 118. In another embodiment, the MSC Server 116 may use the Mg interface to initiate SR-VCC toward Emergency Remote User Agent (E-RUA) 122. Furthermore, the MSC Server 116 may act as a "new SGSN" for location handling post-handover and initiating a Packet Switched Network Induced Location Request (PS-NI-LR) or a similar location reporting procedure towards the Location Information Server (LIS)/Gateway Mobile Location Center (GMLC) 124. In addition, the MSC Server 116 may act as an Anchor MSC with standard E-interface procedures towards the MSC 114 for establishing resources in a target access network for handover of emergency calls and for location reporting post-handovers.

The E-CSCF 118 may provide emergency call VCC functions, such as those defined in 3GPP TR 23.826, which is incorporated herein by reference. The E-RUA/Domain Transfer Function (E-RUA/DTF) 122 may provide functions such as those under 3GPP TR 23.826, which is incorporated herein by reference.

In the situation in which the UE 110 is operating in a 3G mode using PS communications, the RAN 112 communicates with a Serving General Packet Radio Service (GPRS) Support Node (SGSN) 126. The SGSN 126, among other things, aids in delivery of data packets to/from the UE 110.

As one of ordinary skill in the art will appreciate, the above architecture describes some of the features of a 2G/3G network. Also shown in FIG. 1 are elements of a 4G network. Namely, when operating in a 4G mode, the UE 110 connects via an eNodeB 130, sometimes referred to as an evolved UTRAN (eUTRAN), which provides a packet-based wireless access point. The eNodeB 130 connects to a Serving Packet Data Network (PDN) Gateway (GW) 132, which in turns provides a connection towards a remote end. The eNodeB 130 is also connected to the Mobility Management Entity (MME) 128 within the 4G network, wherein the MME 128 provides mobility functionality for the UE 110.

The MME 128 may provide the same functions as specified in current 3G protocols, such as 3GPP TS 23.216, which is incorporated herein by reference, and other additional features in accordance with embodiments of the present invention. For example, the MME 128 may be enhanced such that it identifies a UE 110 and indicates an emergency call as part of a handover request. Moreover, when the MSC Server 116 uses the Mg interface, the MME 128 may provide an E-RUA Public Service Identity (PSI) Domain Name (DN) as part of a handover request. The E-RUA PSI DN may be configured on the MSC Server 116 or on the MME 128 or provided by a Home Subscriber Server (HSS) to the MME 128 on E-UTRAN-Attach. The MME 128 may also provide to the MSC Server 116 a Gateway Mobile Location Center (GMLC) address as part of a handover request and indicate whether a PS-NI-LR is needed upon handover.

When an emergency call is placed, whether the call is placed via the RAN 112 or the eNodeB 130, the call is directed toward the Public Safety Answering Point (PSAP) 140. A Location Retrieval Function (LRF)/Voice-over-IP Positioning Center (VPC) 142 provides location information to the PSAP 140.

It should be noted that other network elements, such as routers, gateways, switches, media gateways, and/or the like, may be present within the network. The configurations and the communications between network elements as they are relevant to embodiments of the present invention are provided for illustrative purposes only to provide a better understanding of the present invention. As such, the communications between the specified elements may be between different elements and/or through additional elements and different signaling/commands may be used.

As discussed in greater detail in the following paragraphs, the general principles of the present invention may be applied to various scenarios. It should be noted that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), ISDN User Part (ISUP), or the like.

Figure 2:
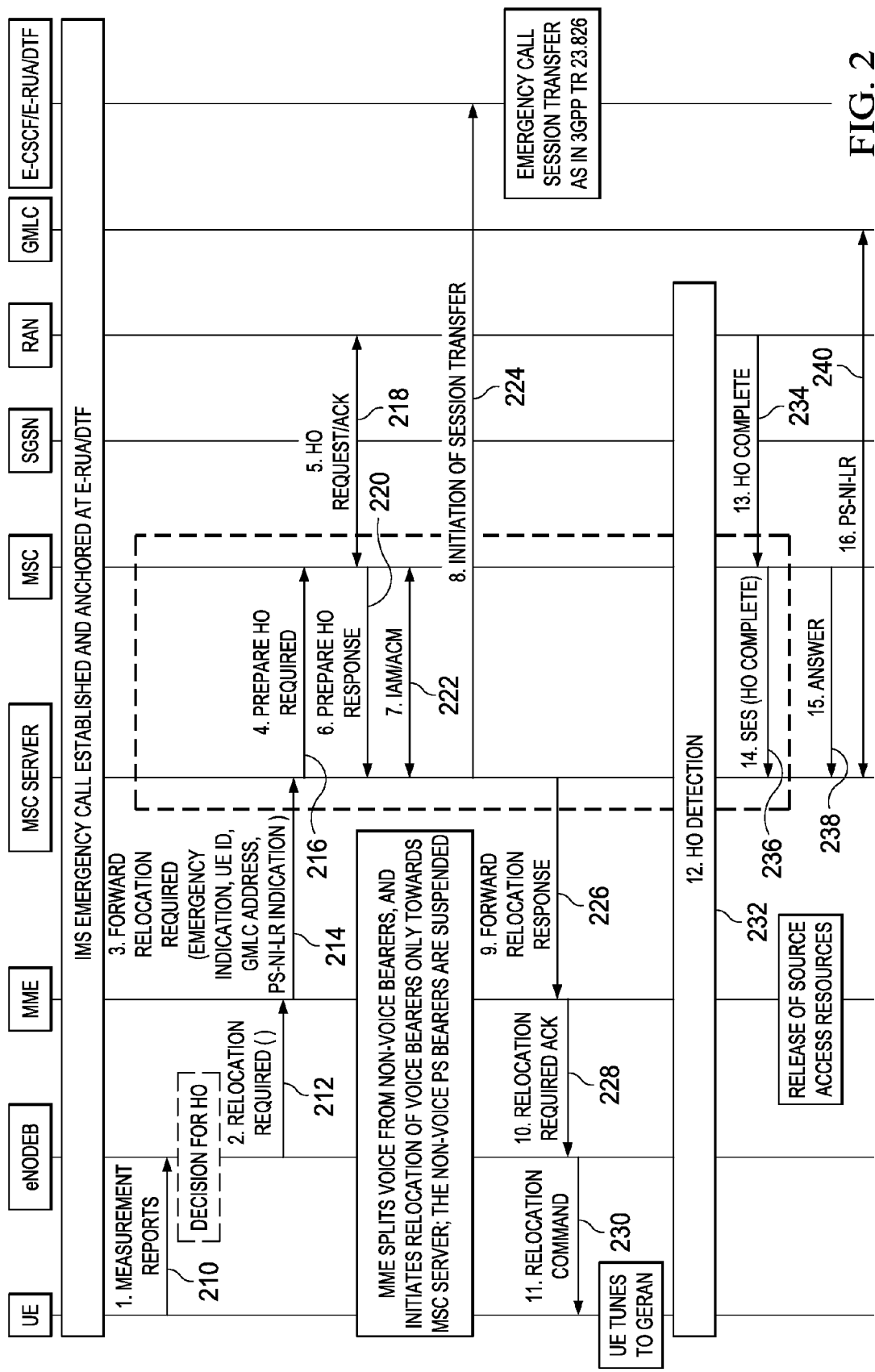
FIG. 2 is a message flow diagram illustrating transfer of an emergency session from the PS domain to the CS domain in accordance with an embodiment of the present invention.

FIG. 2 is a message flow diagram that further illustrates a handover procedure in which an emergency call session is handed over from the 4G network to the 2G/3G network in accordance with an embodiment of the present invention. The process illustrated in FIG. 2 assumes that an IMS emergency call has already been established and anchored at the E-RUA/DTF 122. In step 210, radio measurements between the UE 110 and the RAN 112/eNodeB 130 trigger a handover procedure from the PS domain to the CS domain. Accordingly, in step 212, the eNodeB 130 transmits a Relocation Required message to the MME 128, which in turn transmits a Forward Relocation Request message to the MSC Server 116 in the CS domain in step 214. The MME 128 splits voice from non-voice bearers, and initiates relocation of voice bearers only towards MSC Server 116, wherein the non-voice PS bearers are suspended. One of ordinary skill in the art will realize that the communication between the MME 128 and the MSC Server 116 is requesting handover from the PS 4G domain to the CS 2G/3G domain.

The MME 128 inserts parameters into the Relocation Required messages that indicate that the session being transferred is an emergency call, a UE identifier that indicates the UE from which the emergency call was placed, a GMLC address, and a PS-NI-LR or similar indication. Upon receipt, in step 216, the MSC Server 116 instructs the appropriate MSC 114 to prepare for a handover via a Prepare Handover Request message. Step 218 illustrates that a handover request and acknowledgement messages are exchanged between the MSC 114 and the RAN 112 to which the UE 110 is to be handed, thereby preparing the UE 110 and the RAN 112 for the impending handover.

It should be noted that FIG. 1 and FIG. 2 illustrate the embodiment in which the MSC Server 116 and the MSC 114 are separate network elements for illustrative purposes only. As such, FIG. 2 illustrates messages that may be transmitted between the MSC Server 116 and the MSC 114. In another embodiment, the MSC Server 116 and the MSC 114 may be combined into a single network element, e.g., when MSC Server 116 serves the target access network. In this embodiment, the messages transmitted between the MSC Server 116 and the MSC 114, illustrated in FIG. 2 by a dashed rectangle, may be reduced and/or eliminated.

Upon receiving the handover acknowledgement message from the RAN 112, the MSC 114 sends a Handover Response message to the MSC Server 116 in step 220. The MSC Server 116 and the MSC 114 exchange an Initial Address Message (IAM) and Address Complete Message (ACM) as illustrated in step 222 to establish a circuit connection between the MSC 114 and the Media Gateway (MGW) (not shown). At this point, the network elements in the CS domain are ready for handover to be completed. Accordingly, upon completion of this message exchange, the MSC Server 116 transmits a message to the E-CSCF 118 to initiate the session transfer in step 224. The E-CSCF 118 performs emergency call session transfer as indicated in 3GPP TR 23.826, which is incorporated herein by reference.

In an embodiment, the MSC Server 116 uses an Mw interface to emulate a P-CSCF for presentation of an IMS emergency session to an E-CSCF. In another embodiment, the MSC Server 116 uses an Mg interface to initiate SR-VCC toward E-RUA. The MSC Server 116 acts as a "new SGSN" for location handling post handover and initiate a PS-NI-LR or similar location reporting procedure towards the GMLC as described in 3GPP TS 23.271, which is incorporated herein by reference. In addition, the MSC Server 116 may act as an Anchor MSC with standard E interface procedures toward the MSC 114 for establishing resources in a target access network for handover of emergency calls and for location reporting post handovers.

In steps 226 and 228, the MSC Server 116 transmits a Forward Relocation Response message to the MME 128, which transmits a Relocation Required Acknowledgement message to the eNodeB 130. The eNodeB 130 transmits a Relocation Command to the UE 110 in step 230 to cause the UE 110 to tune to the RAN 112.

In step 232, handover is detected, indicating that the UE 110 has successfully been handed over to the RAN 112. As a result, in step 234 the RAN 112 transmits a Handover Complete message to the MSC 114, which signals the completion of handover to the MSC Server 116 with a SES handover Complete message in step 236. The MSC 114 also transmits an Answer message to the MSC Server 116 to indicate the completion of the circuit connection in step 238.

In step 240, the MSC Server 116 initiates a Packet Switched Network Induced Location Request (PS-NI-LR) or similar location reporting procedure towards the GMLC 124.

Figure 3:
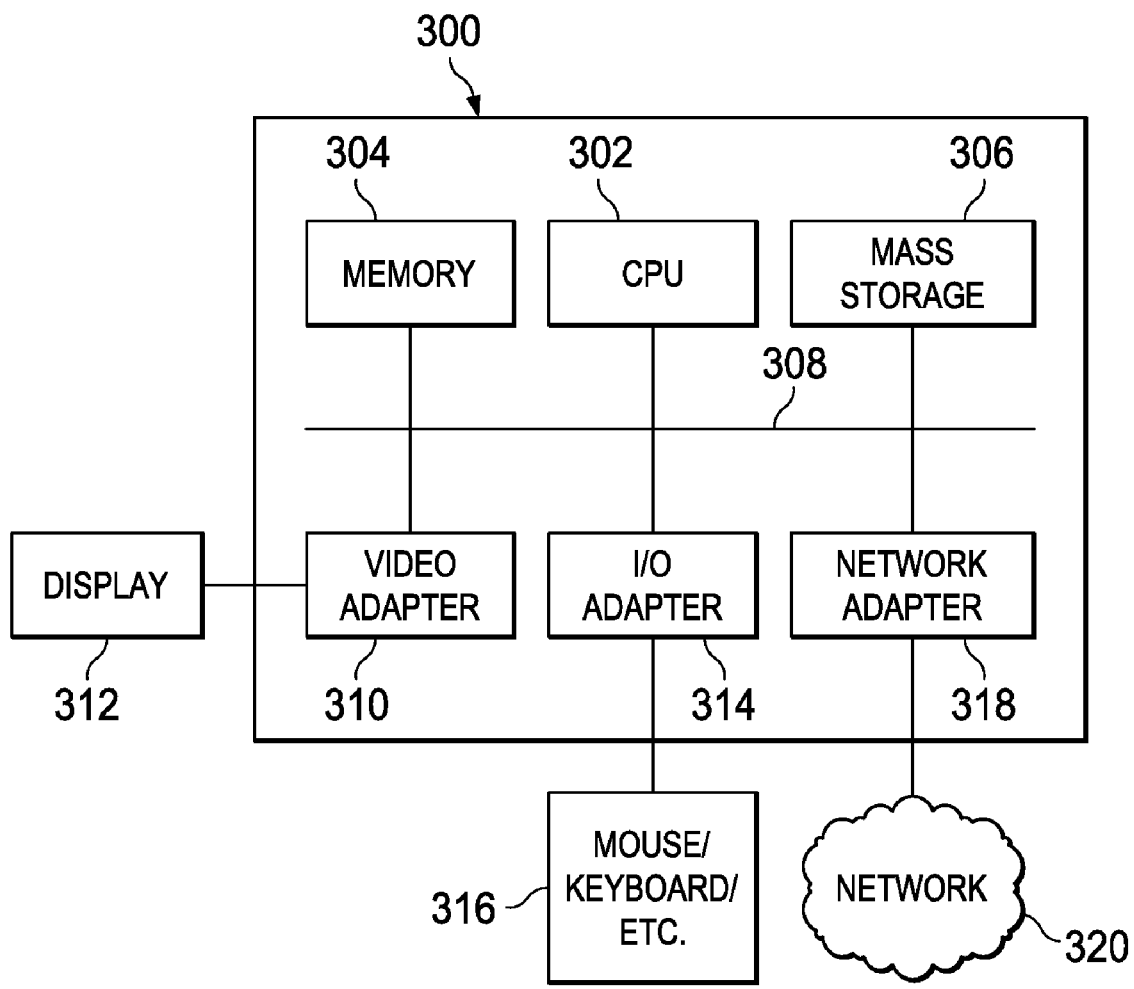
FIG. 3 is a block diagram of a network element in accordance with an embodiment of the present invention.

Referring now to FIG. 3, a block diagram of a network element 300 is provided in accordance with an embodiment of the present invention. The network element 300 depicts a general purpose platform and the general components and functionality that may be used to implement any or all of the UE 110, E-CSCF 118, P-CSCF 120, eNodeB 130, MME 128, MSC 114, MSC Server 116, and/or the like. The network element 300 may include, for example, a central processing unit (CPU) 302, memory 304, and a mass storage device 306 connected to a bus 308 configured to perform the processes discussed above. The network element 300 may further include, if desired or needed, a video adapter 310 to provide connectivity to a local display 312 and an I/O adapter unit 314 to provide an input/output interface for one or more input/output devices 316, such as a mouse, a keyboard, printer, tape drive, CD drive, or the like.

The network element 300 also includes a network adapter 318, which may be a wired link, such as an Ethernet cable or the like, and/or a wireless/cellular link, that provides a connection to a network 320. In an embodiment, the network adapter 318 comprises a switching fabric for switching bearer and signaling channels. The network adapter 318 may also comprise a suitable receiver and transmitter for wireless communications. It should be noted that the network element 300 may include other components. For example, the network element 300 may include power supplies, cables, a motherboard, removable storage media, cases, and the like. These other components, although not shown, are considered part of the network element 300.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for handing an emergency session with a user equipment (UE) from a packet switch (PS) domain to a circuit switch (CS) domain, the system comprising:
   an eNodeB in the PS domain;
   a Mobility Management Entity (MME) in the PS, the MME configured to receive from the eNodeB a relocation message for an emergency call;
   a Mobile Switching Center (MSC) Server in the CS domain, the MSC Server configured to receive from the MME a handover request via a first interface, the handover request including an emergency call indication; and
   an Emergency Call Session Control Function (E-CSCF) communicatively coupled to the MSC Server via a second interface of the MSC Server, the E-CSCF configured to receive a session transfer request from the MSC Server.

2. The system of claim 1, wherein the second interface is an Mg interface.

3. The system of claim 1, wherein the second interface is an Mw interface, the MSC Server emulating a Proxy CSCF (P-CSCF).

4. The system of claim 1, further comprising a Gateway Mobile Location Center (GMLC), the MSC Server configured to initiate a location reporting procedure toward the GMLC.

5. The system of claim 4, wherein the location reporting procedure is a Packet Switched Network Induced Location Request (PS-NI-LR).

6. The system of claim 1, wherein the handover request includes an Emergency Remote User Agent (E-RUA) Public Service Identity (PSI) Domain Name (DN).

7. A method of performing an emergency call handover from a packet switch (PS) domain to a circuit switch (CS) domain, the method comprising:
  receiving a handover request of an emergency call from a user equipment coupled to an eNodeB in the PS domain to the user in the CS domain, the handover request being received from the PS domain and including an emergency indication;
  preparing network elements in the CS domain for the emergency call;
  initiating a handover of the emergency call;
  receiving an indication that the handover is complete; and
  initiating a location reporting procedure.

8. The method of claim 7, wherein the handover request includes an Emergency Remote User Agent (E-RUA) Public Service Identity (PSI) Domain Name (DN).

9. The method of claim 7, wherein the handover request includes a Packet Switched Network Induced Location Request (PS-NI-LR) indication.

10. The method of claim 7, wherein the location reporting procedure is a Packet Switched Network Induced Location Request (PS-NI-LR).

11. The method of claim 7, wherein the handover request is received from a Mobility Management Entity (MME).

12. The method of claim 7, wherein the handover request includes a Gateway Mobile Location Center (GMLC) address.

13. A method of performing an emergency call handover from a packet switch (PS) domain to a circuit switch (CS) domain, the method comprising:
  receiving an indication from an eNodeB in the PS domain that handover of a session is required, the session being an emergency call from a user equipment coupled to the eNodeB; and
  transmitting a handover request to a network element in the CS domain, the handover request including an indication that the session is an emergency call and including a user equipment identifier.

14. The method of claim 13, further comprising indicating whether a location reporting procedure is to be performed upon completing handover.

15. The method of claim 14, wherein the location reporting procedure is a Packet Switched Network Induced Location Request (PS-NI-LR).

16. The method of claim 13, wherein the handover request includes an Emergency Remote User Agent (E-RUA) Packet Switched Network Induced Location Request (PS-NI-LR).

17. The method of claim 13, wherein the handover request includes a Gateway Mobile Location Center (GMLC) address.

18. A Mobile Switching Center (MSC) Server comprising:
  a first interface to a first network element, the first network element being in a Packet Switch (PS) domain;
  a second interface to a second network element, the second network element being in a Circuit Switch (CS) domain; and
  a processor configured to receive from the first interface a handover request for an emergency call for a user equipment coupled to an eNodeB in the PS domain to the user in the CS domain and configured to facilitate a handover of the emergency call from the PS domain to the CS domain.

19. The MSC Server of claim 18, wherein the handover request includes an indication that a location reporting procedure is to be performed upon completing handover.

20. The MSC Server of claim 19, wherein the location reporting procedure comprises a Packet Switched Network Induced Location Request (PS-NI-LR).

21. The MSC Server of claim 18, wherein the handover request includes an Emergency Remote User Agent (E-RUA) Public Service Identity (PSI) Domain Name (DN).

22. The MSC Server of claim 18, wherein the handover request includes a Gateway Mobile Location Center (GMLC) address.

23. The MSC Server of claim 18, wherein the second interface is an Mw interface.

24. The MSC Server of claim 18, wherein the second interface is an Mg interface.

25. The MSC Server of claim 18, further comprising initiating a Packet Switched Network Induced Location Request (PS-NI-LR).

* * * * *